(12) United States Patent
Koelker (10) Patent No.: US 7,261,129 B2
(45) Date of Patent: *Aug. 28, 2007

(54) MACHINE FOR LOADING SILAGE BAG (76) Inventor: Michael J. Koelker, 11272 Wuchter Rd., Dyersville, IA (US) 52040

(*) Notice: Subject to any disclaimer, the term of this patent is extended or adjusted under 35 U.S.C. 154(b) by 0 days.

This patent is subject to a terminal disclaimer.

(21) Appl. No.: 11/406,153

(22) Filed: Apr. 18, 2006

(65) Prior Publication Data

US 2006/0180238 A1    Aug. 17, 2006

(51) Int. Cl.
    *A01F 25/00* (2006.01)
(52) U.S. Cl. .................. 141/73; 141/114; 141/231; 100/100; 53/255; 53/570
(58) Field of Classification Search ............ 141/114, 141/73, 231; 100/66–69, 100; 53/459, 473, 53/475, 570
    See application file for complete search history.

(56) References Cited

U.S. PATENT DOCUMENTS

| 4,310,036 | A | * | 1/1982 | Rasmussen et al. ........ 141/114 |
| 4,327,543 | A |   | 5/1982 | Currie et al. .................. 56/344 |
| 5,140,802 | A |   | 8/1992 | Inman et al. ................... 53/459 |
| 5,662,036 | A | * | 9/1997 | Daniel ........................... 100/209 |
| 6,061,999 | A | * | 5/2000 | Wingert ........................ 53/438 |
| 6,866,073 | B1 |  | 3/2005 | Meixelsperger et al. ...... 141/73 |
| 6,978,811 | B1 |  | 12/2005 | Meixelsperger et al. .... 141/314 |

FOREIGN PATENT DOCUMENTS

| GB | 2303818 A | 3/1997 |
| JP | 406153683 A | 6/1994 ............ 100/269.01 |

OTHER PUBLICATIONS

Versa Bagger: http://www.versacorporation.com
AG-BAG International—Feed Storage Baggers: http://www.ag-bag.com.
RotoPress: http://www.siouxautomation.com/RotoPressOver.html.
RotoPac: http://siouxautomation.com/RotoPacOver.html.

* cited by examiner

*Primary Examiner*—J. Casimer Jacyna
(74) *Attorney, Agent, or Firm*—Allan L. Harms; Wenzel & Harms, P.C.

(57) ABSTRACT

A machine for compactly loading an elongate polymer storage bag includes a chamber through which one or more rams reciprocate in a generally horizontal direction, forcing bulk material such as compost, distillers grains, silage, or feedstuffs from the chamber into a frame that carries the gathered sidewall of the storage bag. The frame has a curved upper surface and an open bottom. The bag filling machine is supported on wheels and is forced gradually forward as the bag fills, against the restraint of an adjustable brake. A loading elevator mounted to the side of the bag loading machine feeds the bulk material into the chamber.

19 Claims, 10 Drawing Sheets

MACHINE FOR LOADING SILAGE BAG

CROSS-REFERENCE TO RELATED APPLICATIONS

This application claims priority from co-pending patent application entitled "Silage Bag Filling Machine", Ser. No. 10/430,862, filed May 6, 2003. The disclosure of patent application Ser. No. 10/430,862 is hereby incorporated in its entirety.

BACKGROUND OF THE INVENTION

The present invention pertains to the filling of elongate storage bags such as are used to store silage feed for farm livestock. In the raising of livestock and particularly the raising of dairy cattle, hay and green corn are cut to a specified fiber length and are stored on the farm in silage bunkers or in lengthy large-diameter plastic silage bags that may extend for considerable length. The plastic bags are relatively thick-walled flexible bags that are available in various cross sectional areas, but generally four-foot to nine-foot diameter bags are used for silage storage. These bags are ideally filled compactly with silage allowing few air pockets so that the silage feed remains in good condition for months at a time.

Elongate plastic silage bags can also be used for storage of compost, distillers grains, and other forage materials as well.

Filling of the lengthy silage bags is currently accomplished by use of one of two types of machines that force silage into the bags. In one type of machine, silage is forced into the elongate storage bag by use of a transverse rotating roller that is fitted with radial arms that sweep the silage into the bag. A backstop is retained to the machine by cables attached to winches mounted on either side of the machine. The backstop is used to prevent the bag from being forced away from the machine before it is filled to proper compaction. In another type of machine, a screw auger oriented to the axis of the bag forces silage therealong into the interior of the bag. Both types of machines are typically powered from the power take off shaft of a farm tractor and require substantial power to operate.

The conventional machines require substantial power to operate them, namely at least ninety horsepower, and in addition, the cables which extend along the sides of the bag tend to abrade the bag, leading to breaks in the sidewall of the bag along its length, which leads to loss of the desired airtight packaging.

BRIEF SUMMARY OF THE INVENTION

The invention of this disclosure provides a bag-filling machine for loading an elongate large diameter bag traditionally used for silage but which may also be filled with various kinds of bulk vegetative or fibrous matter, including compost and distillers grains. The machine uses substantially less power from the power unit or farm tractor operating the machine than conventional machines. The improved machine fills silage bags properly without the need for a backstop and cables to hold the backstop. An elongate housing is oriented generally horizontally and has a hut-like frame extending from it. The frame has a curved top, sides, and an open bottom and is used to store the unused silage bag around it and to hold the bag open so that it can be filled. The frame has an open bottom for ease of removal of the machine from the open end of a filled bag.

The elongate housing contains one or more reciprocating rams sliding back and forth within it such that silage or other vegetative matter entering the housing is forced by the rams into the frame and then into the bag from the force of material being continually forced out of the housing. The housing has an opening at its top such that silage, compost, wet or dry distillers grains, or other vegetative matter can drop into the housing to be acted on by the rams. An elevator is mounted to the top of the housing and allows bulk material to be lifted up and fed into the opening in the housing. The elevator may elevate silage, compost, distillers grains, fodder, or other fibrous or vegetative matter so that the matter can be dropped into the housing for transfer of the matter from the ram housing to the open frame on which the bag is gathered. The elevator may be wider than the opening in the top of the housing and a secondary collector conveyor may be used to consolidate the silage or other vegetative matter into the opening of the housing. The elevator is equipped with hydraulic cylinder powered arms that allow easy adjustment of the elevator and its storage alongside the housing when the unit is ready for movement to another work site. This machine provides an improved loading of the storage bag with less power needed from the power unit, typically a farm tractor.

It is a primary object of the invention to provide a silage bag filling machine that operates on substantially less power than conventional machines while properly compacting silage or other bulk material loaded in the silage bag.

It is another object of the invention to provide a silage bag filling machine that does not require a backstop.

It is also an object of the invention to provide a versatile bag filling machine that is compact and may be transported efficiently and safely.

It is yet an additional object of the invention to provide an efficient machine for loading an elongate tubular storage bag with agricultural products including compost, wet or dry distillers grains, various kinds of forage or feedstuffs, or other vegetative matter which may be usefully stored in an elongate tubular storage bag such as is typically used to store silage.

These and other objects of the invention will become apparent from examination of the description and claims that follow.

DETAILED DESCRIPTION OF THE INVENTION

Figure 1:
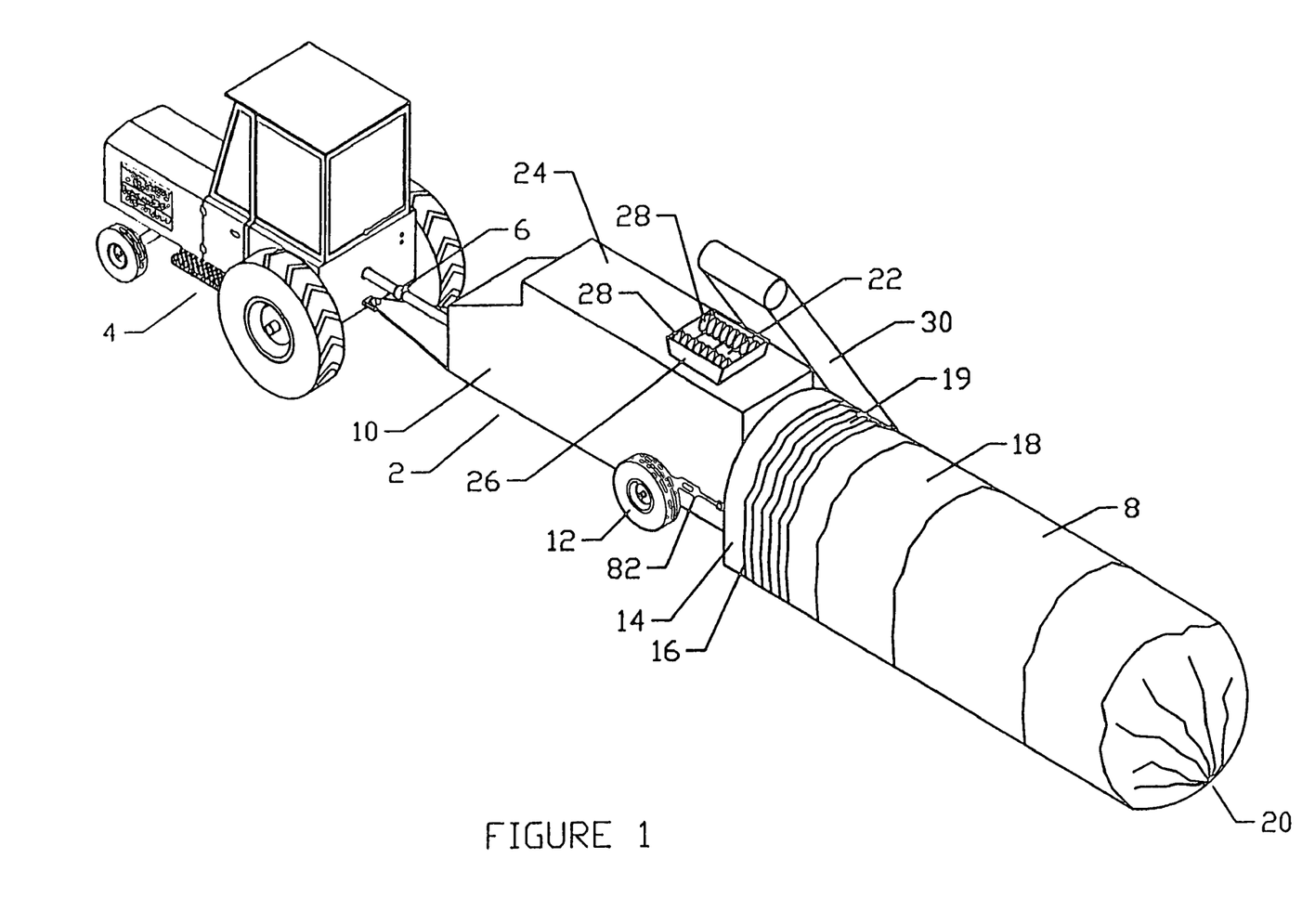
FIG. 1 is a perspective view of the bag loading machine of the present invention being powered by the power take off of a tractor and with a silage bag mounted at the output end of the machine.

FIG. 1 discloses a first embodiment of bag filling invention 2 being powered by tractor 4 or a like power unit having a power take off shaft 6. An elongate silage bag 8 is mounted to invention 2 and is shown in FIG. 1 in a partially filled condition. In operation, the wheel drive transmission of tractor 4 is left in neutral so that the tractor 4 and invention 2 may creep ahead in response to silage being forced into silage bag 8. Invention 2 comprises a housing 10 supported on wheels 12 and includes a frame 14 about which the open end 16 of bag 8 may be placed and the sidewall 18 of bag 8 may be gathered. Bag 8 is a conventional continuous open tube of flexible plastic material that has been tied closed at its distal end 20.

Housing 10 is provided with a port 22 in its roof 24. Port 22 provides an entryway for silage into the interior of housing 10. Overlying port 22 is collection box 26 which is equipped with screw conveyers 28 which move silage within collection box 26 toward port 22. An elevator 30 is mounted movably to housing 10 to provide means to feed silage into collection box 26 for collection and transfer into port 22. After silage is dropped into port 22, it is forced into open end 16 of bag 8. Gathers 19 of sidewall 18 of bag 8 are pulled from frame 14 as the effective length of silage bag 8 increases as bag 8 fills with silage. Customarily bag 8 will be supported on the ground surface and left outdoors as a long-term storage of silage intended as livestock fodder.

Figure 2:
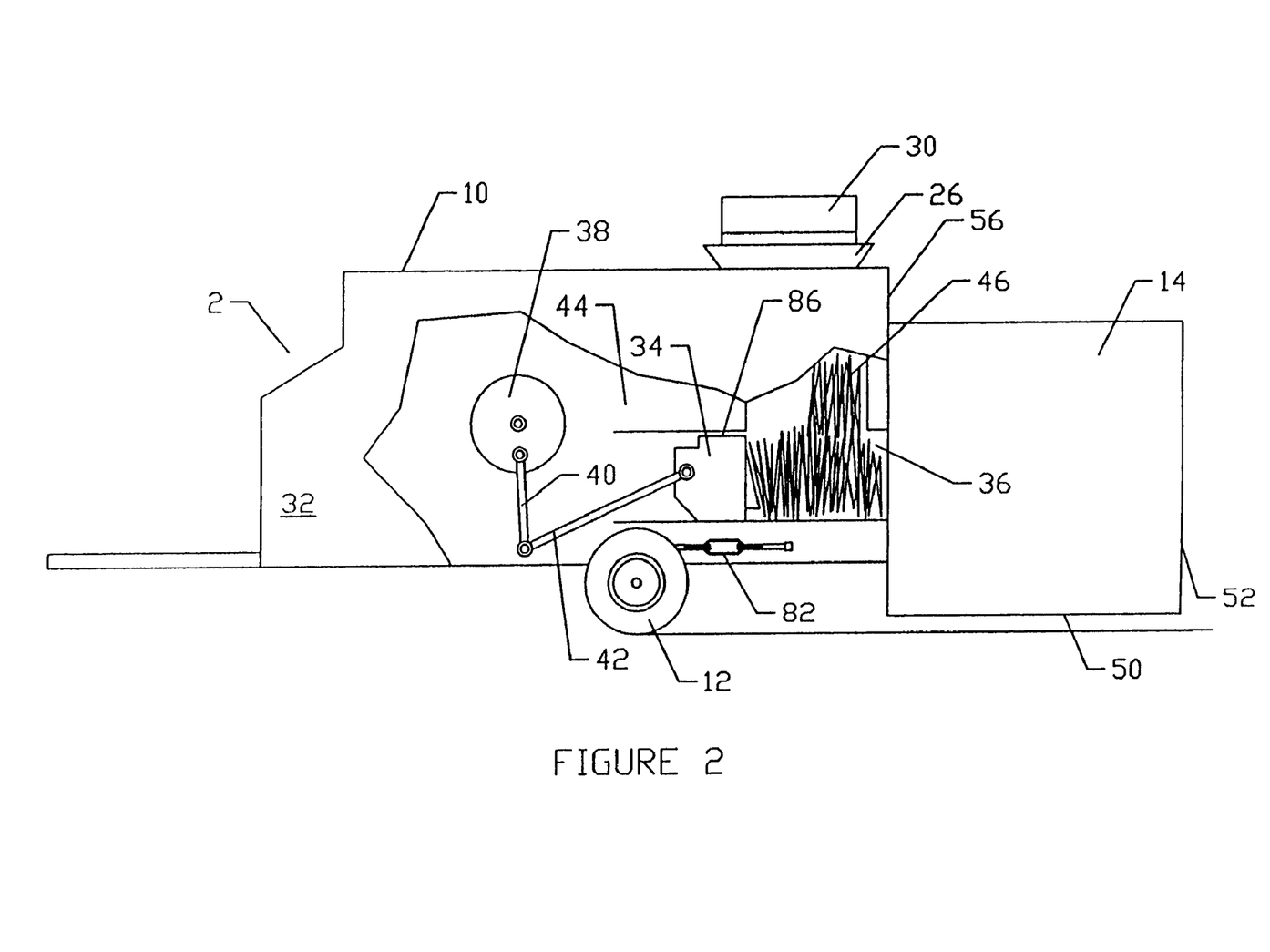
FIG. 2 is a front elevation of an embodiment of the bag loading machine of the present invention with part of its front sidewall cut away.

Referring now in addition to FIG. 2, the invention 2 is shown with part of its front sidewall 32 cut away to reveal schematically the operative components therein. A reciprocating ram 34 is operable in a generally horizontal path within compaction chamber 36. Ram 34 is driven by a drive wheel 38 coupled to ram 34 by linkage arms 40,42. Rotation of drive wheel 38 causes ram 34 to move rearward in housing 10 across compaction chamber 36 and then to retract below wiper 44. Silage 46 or such other bulk material to be bagged drops from collection box 26 into compaction chamber 36 and is forced by ram 34 into frame 14 about which a silage storage bag may be mounted. Because bulk material such as compost, distillers grains, forage or silage 46 will be continuously fed to invention 2, the bulk material will necessarily drop onto ram 34 when it is thrust toward the frame 14, and wiper 44 will strip the bulk material from top 86 of ram 34 as it retracts.

Figure 3:
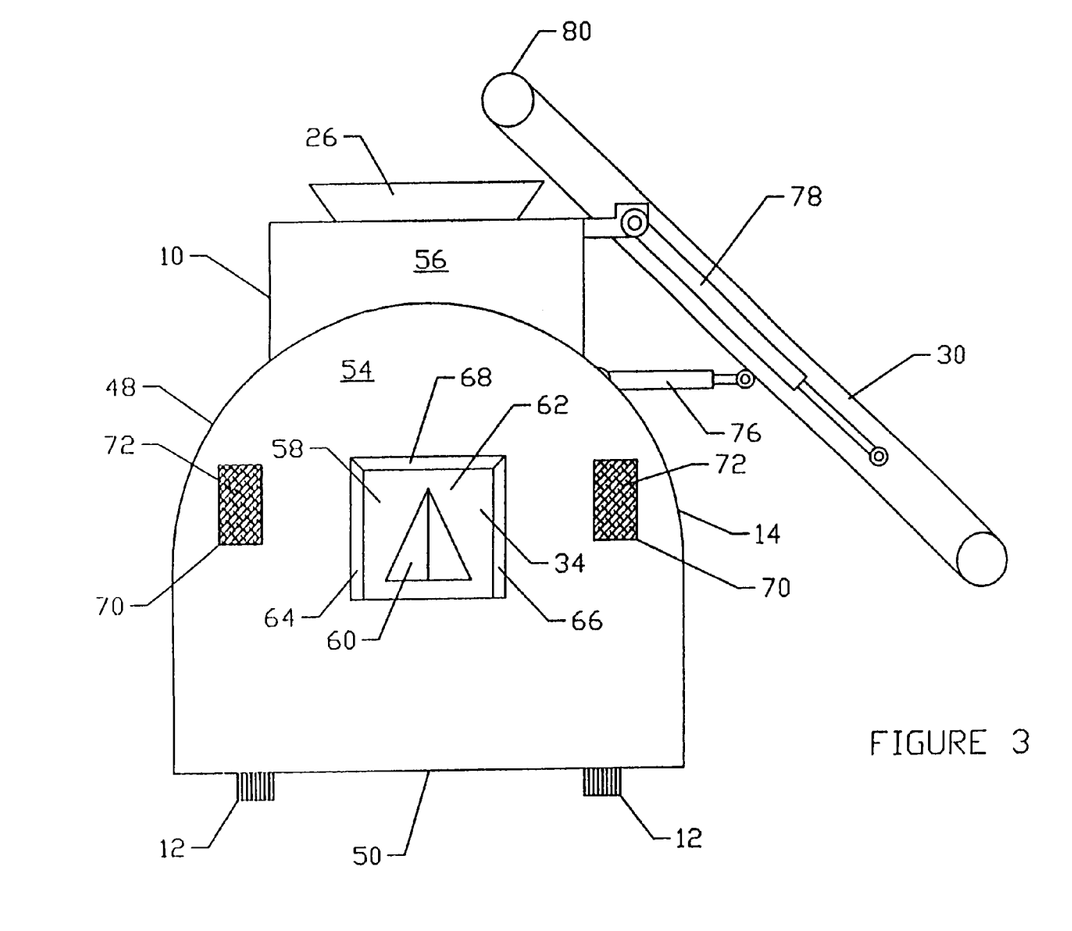
FIG. 3 is a side plan view of the bag loading machine of FIG. 2.

Referring now in addition to FIG. 3, it can be seen that frame 14 is preferably provided with a sidewall 48 of generally inverted u-shape and an open bottom 50. Frame 14 is open at its rear end 52 and has a front wall 54 that abuts the rear end wall 56 of housing 10. The working face 58 of ram 34 is provided with spear element 60 extending therefrom, though a planar working face 58 is also functional. Discharge opening 62 of compaction chamber 36 opens into frame 14 and is provided with flanges 64, 66, 68 which flare outwardly from discharge opening 62 at the sides and top thereof respectively. Windows 70 covered with screen or mesh 72 may be provided in front wall 54 for observation of silage located within frame 14.

Elevator 30 is supported by hinge bracket 74 and by first hydraulic cylinder 76 so that elevator 30 may swing away from housing 10 by extension of first hydraulic cylinder 76 and be raised or lowered longitudinally by second hydraulic cylinder 78 to position upper end 80 of elevator 30 generally over collection box 26 so that silage conveyed upwardly along elevator 30 will drop into collection box 26. At least one of wheels 12 of housing 10 is equipped with a manually adjustable brake control 82 which permits tension on the brake of the wheel 12 to be set such that the invention 2 and tractor 4 may be forced ahead gradually as the bag 8 is filled. Manual adjustment of the wheel brake by brake control 82 allows the user to selectively restrict longitudinal movement of the invention 2 where invention 2 is stationed on a slight slope or in response to the softness of the surface on which wheels 12 rest. In the preferred embodiment, turnbuckle 84 is mounted to housing 10 at one end thereof and to a brake shoe on the other end thereof and may be lengthened or shortened manually to increase or decrease tension on the brake shoe.

Figure 4:
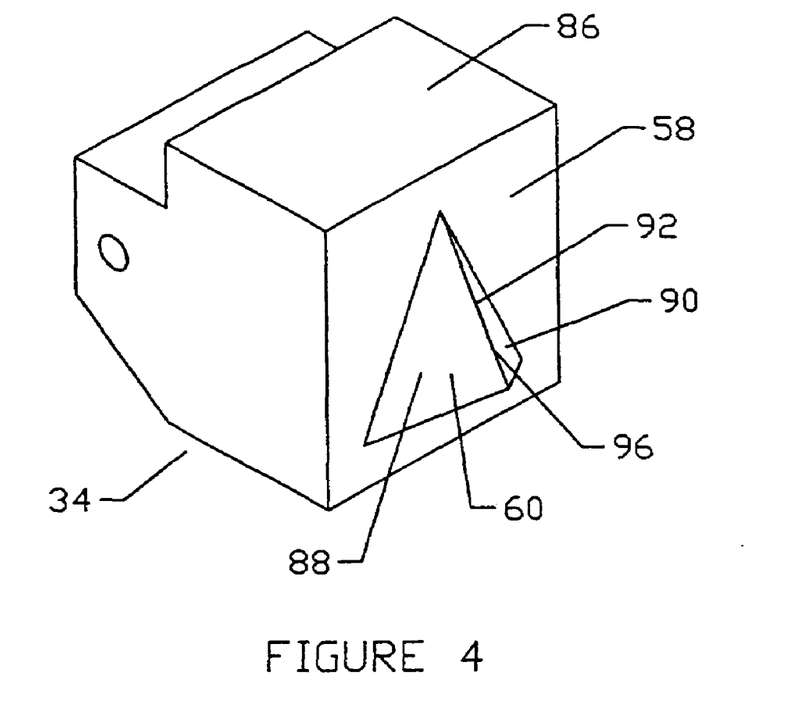
FIG. 4 is a front left perspective of the ram of the preferred embodiment bag loading machine of FIG. 2.
Figure 4A:
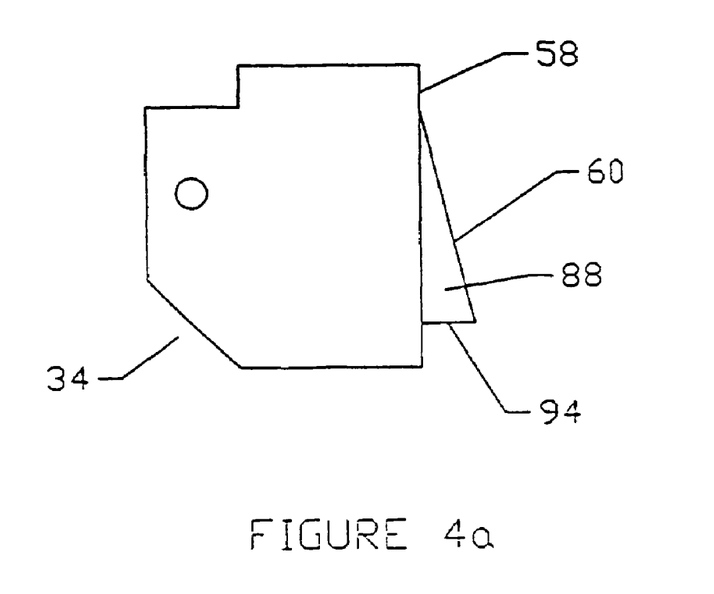
FIG. 4a is a front elevation of the ram of FIG. 4.

An enlargement of the ram body 86 is shown in FIGS. 4 and 4a which show that ram body 86 has disposed on working face 58 thereof a spear element 60 which comprises a pyramidal section including a first facet 88 joined to a second facet 90 at leading corner 92. Spear element 60 includes lower face 94 which with facets 88, 90 defines edge 96. Spear element 60 is fixed generally centrally upon working face 58. First and second facets 88, 90 of spear element 60 extend further from working face 58 as they approach edge 96 of spear element 60 and facets 88, 90 serve to urge silage driven by ram body 86 in an upward vector.

Figure 5:
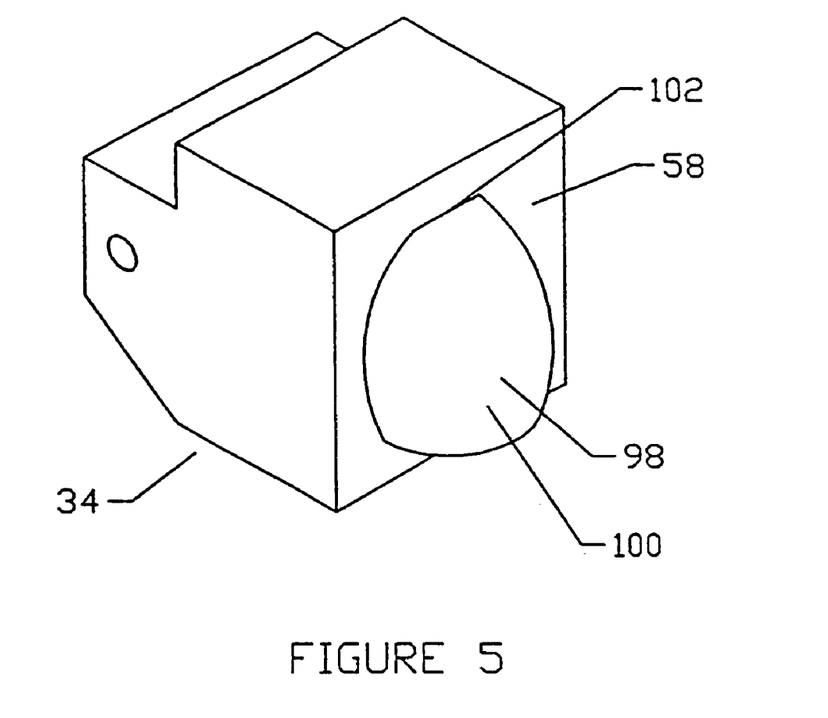
FIG. 5 is a front left perspective of an alternate embodiment ram.
Figure 5A:
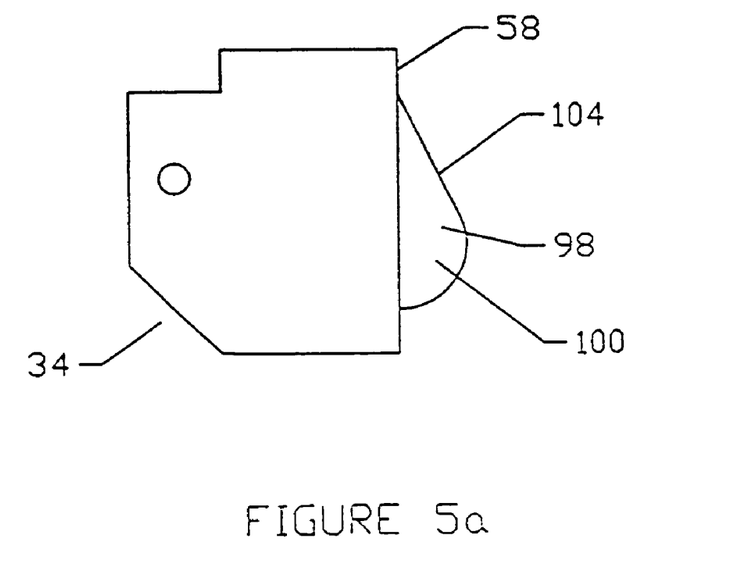
FIG. 5a is a front elevation of the ram of FIG. 5.

FIGS. 5 and 5a illustrate an alternative embodiment of ram 34 wherein a curved protrusion 98 is fixed to working face 58 of ram 34. Protrusion 98 comprises a bulbous lower bulge 100 and a linear upper edge 102 such that the protruding surface 104 of protrusion 98 exerts an upwards and sideways diverging thrust on silage which comes into touching engagement with working face 58. Protrusion 98 may be a segment of an ellipsoid body.

Figure 6:
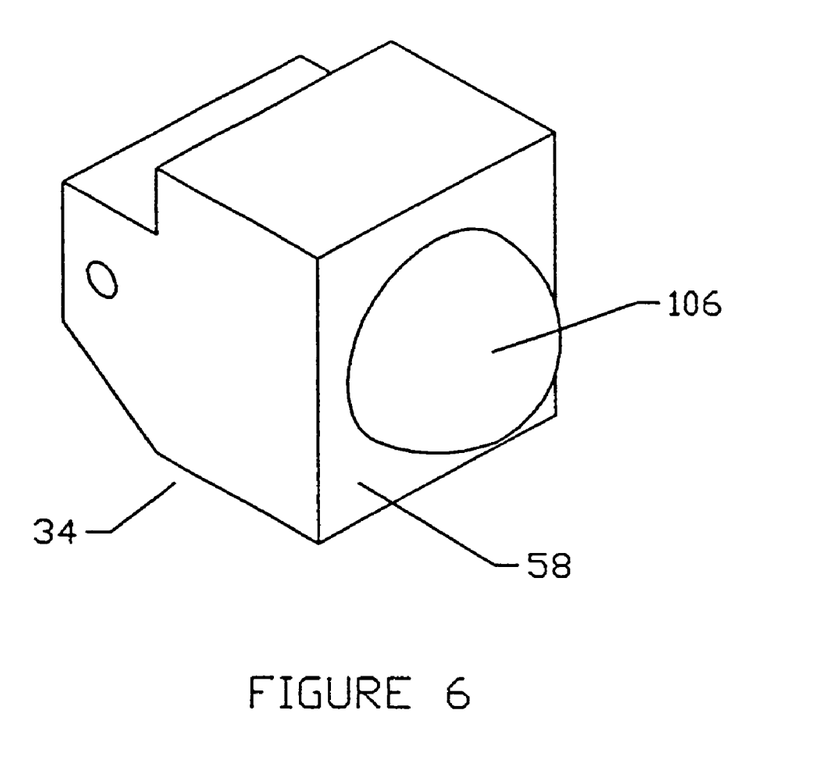
FIG. 6 is a front left perspective of another alternate embodiment ram.
Figure 6A:
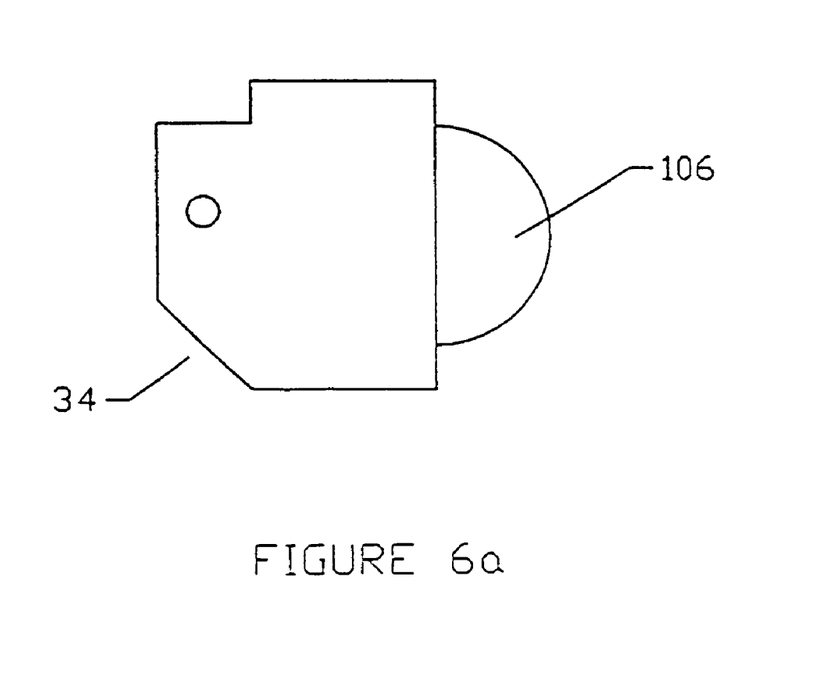
FIG. 6a is a front elevation of the ram of FIG. 6.

Another alternate embodiment of ram 34 is illustrated in FIGS. 6 and 6a wherein a hemispherical protrusion 106 is fixed to working face 58 of ram 34.

Figure 7:
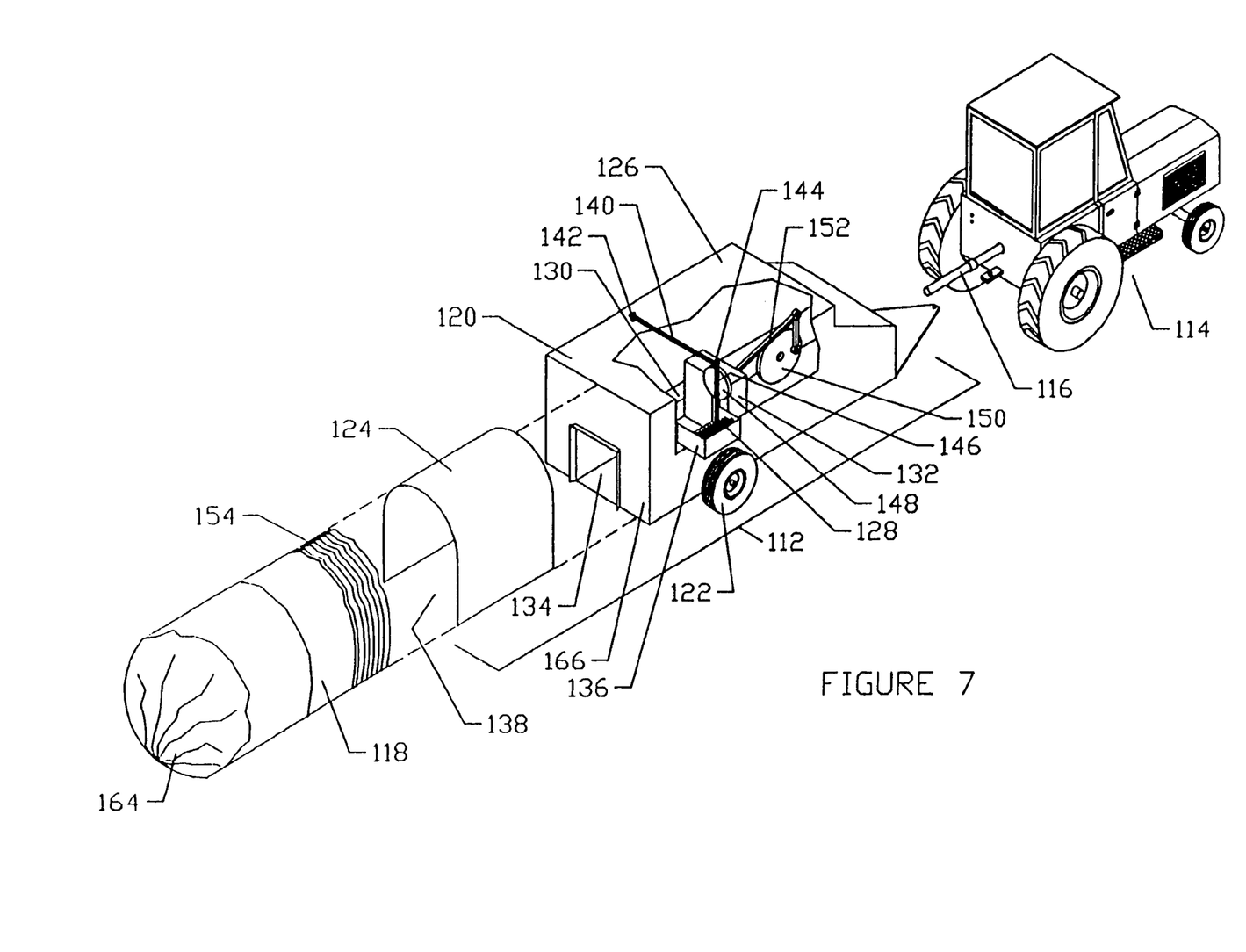
FIG. 7 is an exploded view in perspective of an alternative embodiment bag loading machine, a silage storage bag partly filled by the machine and a tractor for driving the bag loading machine, with parts of the machine cut away.

An alternate embodiment of the silage bag filling machine invention is illustrated in exploded perspective in FIG. 7 wherein alternate embodiment invention 112 is shown being powered by the power takeoff shaft 116 of tractor 114. In this alternate embodiment, silage bag 118 may be of smaller cross section but it may be slid over duct 124 such that its sidewall 154 is gathered or folded telescopingly on itself about the exterior of duct 124. Alternate embodiment invention 112 comprises housing 120 supported on wheels 122 with duct 124 mounted at the rear end 166 of housing 120. A receiving trough 136 into which silage may be poured is disposed laterally on housing 120 such that rake 128 may drag silage from trough 136 into the compaction chamber 130 such that silage will enter the path of compacting ram 132. Compacting ram 132 reciprocates across compaction chamber 130 such that silage is propelled from outlet 134 into bag 128 which surrounds duct 124. It can be seen that duct 124 has an open bottom 138 which is suspended a small distance above the ground to facilitate placement of bag 118 about duct 124 but to also allow silage in bag 118 to load the lower side of the bag 118 such that it will rest on the ground.

The movement of rake 128 is controlled by first link arm 140 which is pivotally anchored to roof 126 of housing 120 such that first link arm may only move vertically about anchor 142. At its free end 144, first link arm 140 is hinged to second link arm 146 which is eccentrically mounted to rake drive wheel 148 along its length such that rake 128 will reciprocatingly move to reach back and over trough 136 and then forward and down into trough 136 to drag any silage in trough 136 into compaction region 130 so that it may be forced through outlet 134 by ram 132. Ram 132 is driven by ram drive wheel 150 and linked thereto by linkage 152 that converts the rotation of ram drive wheel 150 into linear reciprocating motion of ram 132. The observer may identify the ram 132 and rake 128 to be similar to the structures of a 1950's era hay baler that dispenses rectangular bales. In this embodiment, ram 132 reciprocates at approximately thirty-one times per minute. As the ram 132 forces silage into bag 118, invention 112 and tractor 114 are urged to creep ahead as bag 118 is pulled off duct 124 by silage urged against its closed end 162.

Use of the preferred embodiment and the alternate embodiment of the invention has demonstrated that the invention fills a silage bag with evenly packed silage with few air pockets. In addition, either embodiment of the invention operates on far less power than conventional silage bagging machines.

It is further to be understood that the invention 2 may be used to load a silage bag 8 (or other similar large diameter, elongate, tubular, flexible polymeric bag) with various bulk material such as compost, wet or dry distillers grains, various kinds of feedstuffs for livestock, vegetative matter, and the like. Distillers grains are produced during the production of ethanol from corn and are valuable as feed for livestock and include distillers dried solubles, distillers dried grains, condensed distillers solubles, distillers wet grains, and distillers dried grains with solubles. The port 22 of housing 10 provides an entryway for bulk material into the interior of housing 10. Collection box 26 which is equipped with screw conveyers 28 may move compost, distillers grains, forage, or other bulk materials within collection box 26 toward port 22. The elevator 30 is provided to supply the bulk material into collection box 26 for collection and transfer into port 22. After the compost, distillers grains, or other bulk material is dropped into port 22, it is forced into open end 16 of bag 8. Gathers 19 of sidewall 18 of bag 8 are pulled from frame 14 as the effective length of silage bag 8 increases as bag 8 fills with the bulk material dropped into housing 10. Customarily bag 8 will be supported on the ground surface and left outdoors as a long-term storage of the bulk material stored therein.

Figure 8:
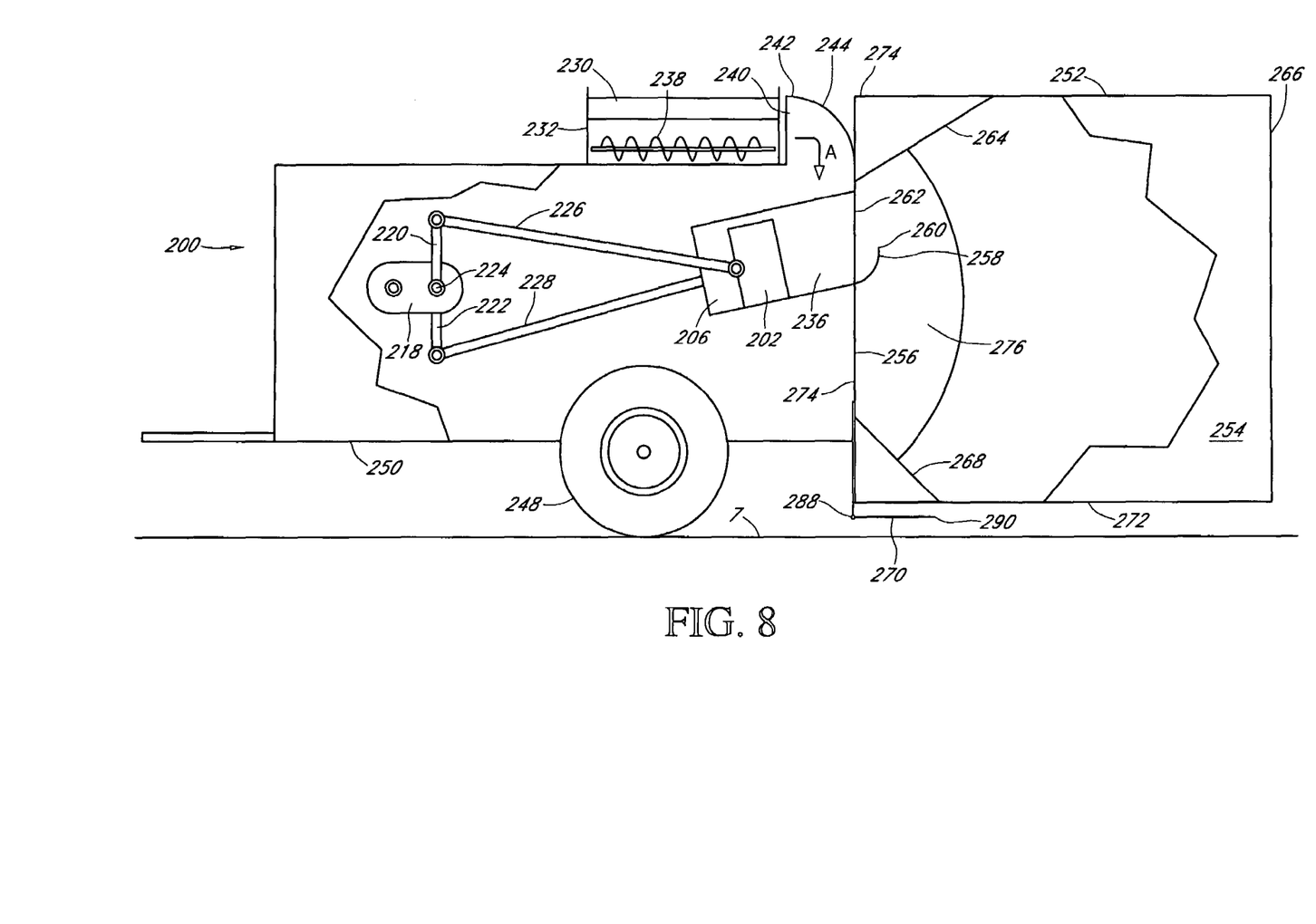
FIG. 8 is a front elevation of a preferred embodiment of the bag loading machine with parts of the front wall cut away.
Figure 9:
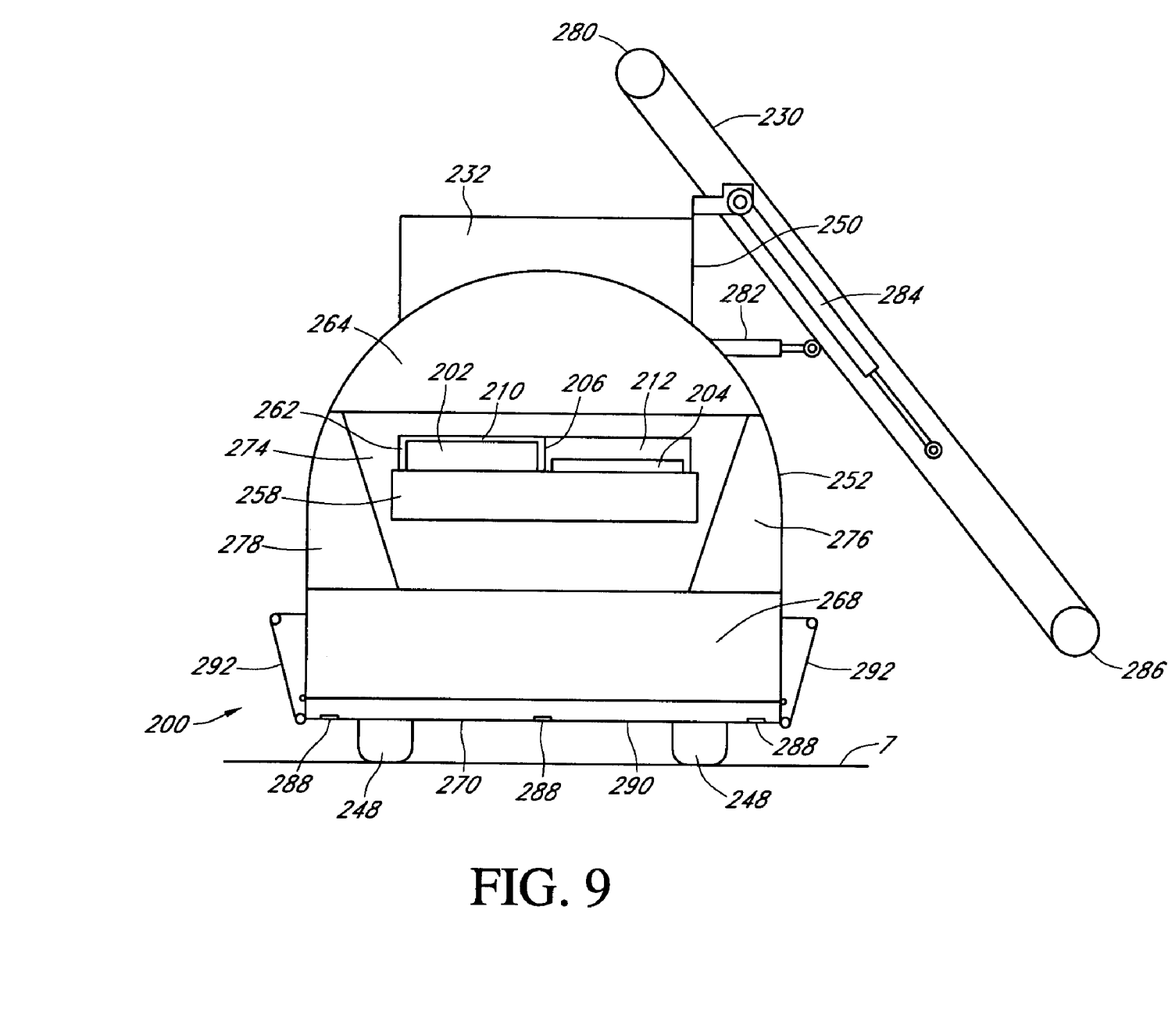
FIG. 9 is a side plan view of the bag loading machine of FIG. 8.
Figure 10:
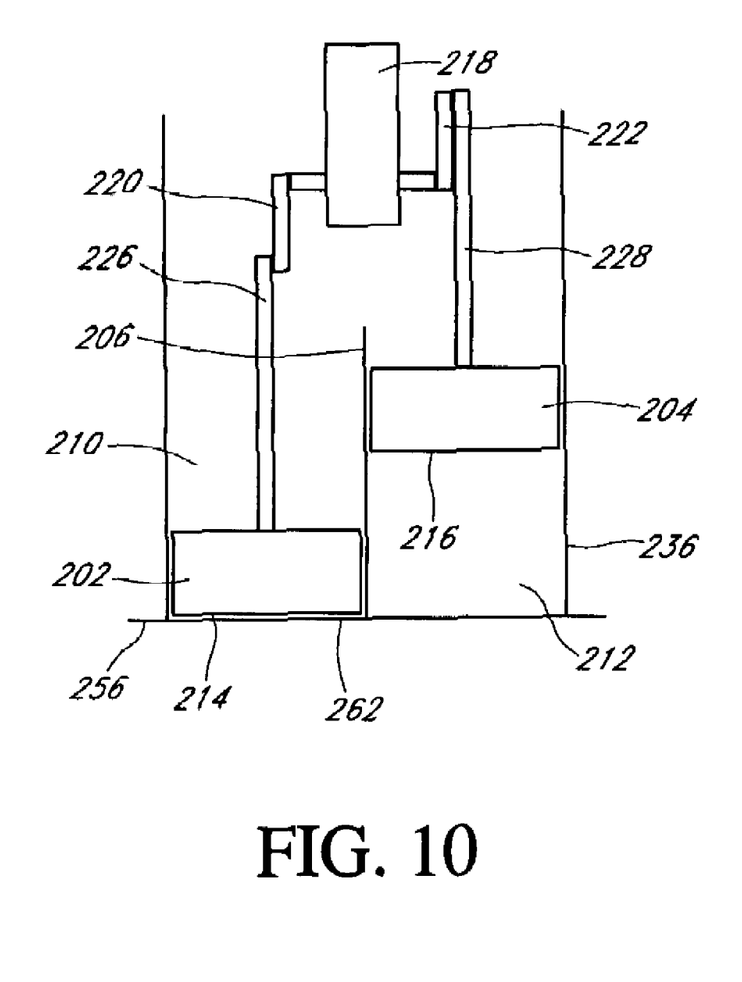
FIG. 10 is a top plan view of the ram system of the preferred embodiment bag loading machine.

A preferred alternative embodiment bag filling machine 200 is illustrated in FIGS. 8, 9, and 10. FIG. 8 illustrates bag filling machine 200 with a portion of the front side of machine body 250 omitted to diagrammatically reveal operable components within machine body 250. Machine body 250 is preferably supported by a pair of ground engaging wheels 248. Hollow elongate frame 252 is supported upon machine body 250 and is shown with a part of sidewall 254 thereof cut away to allow observation of the elements therewithin. Hollow elongate frame 252 is securely mounted to rear end wall 256 of machine body 250 such that it is cantilevered thereon and supported above ground surface 7. Hollow elongate frame 252 comprises a curved sidewall 254 and an open bottom 272 with hollow elongate frame 252 generally of the shape of an inverted "U".

It is seen that machine body 250 houses gearbox 218 which powers opposing crank arms 220, 222 which are rotated by drive shaft 224. Each of crank arms 220, 222 is pivotally joined to a drive rod 226, 228. First drive rod 226 is hinged to first ram 202 while second drive rod 228 is similarly hinged to a second ram 204 (see FIG. 10). First ram 202 is separated from second ram 204 by a vertical dividing wall 206 mounted centrally within transfer chamber 236. Each ram 202, 204 is driven reciprocatingly in alternating fashion, that is, first ram 202 is moved toward discharge opening 262 while second ram 204 is retracted therefrom.

It is to be understood that though rams 202, 204 could be moved along a substantially horizontal path, it is found to be advantageous for rams 202, 204 to move toward discharge opening 262 at a slight incline. In the preferred embodiment of FIGS. 8, 9, that incline is approximately twelve degrees.

An aggregator compartment 232 is carried atop machine body 250 such that bulk material such as fibrous or vegetative material, e.g. compost, forage, distiller grains, grain, hay, or silage, can be elevated by elevator 230 and may drop into aggregator compartment 232 and be forced by screw conveyors 238 into entry way 240 of hood 242 to drop in direction A into transfer chamber 236.

Entry way 240 may have a curved rear wall 244 to deflect bulk material downward into transfer chamber 236 where bulk material may be thrust by rams 202, 204 through discharge opening 262 into hollow elongate frame 252. As bulk material is thrust through discharge opening 262, it is deflected upward by curved deflector 258. It is found that improved performance of bagging machine 200 occurs when the distance from free edge 260 of curved deflector 258 to upper baffle 264 is slightly less than the height of discharge opening 262 and of rams 202, 204 thereby creating a slight constriction in the path of the bulk material. As bulk material exits discharge opening 262, it is thrust upward by curved deflector 258 and may be deflected rearward within sidewall 254 of hollow elongate frame 252 by upper baffle 264. Curved deflector 258 is uniformly upwardly concave with a constant radius from free edge 260 to its attachment to front wall 274 of frame 252.

Guard plate 268 prevents bulk material from falling onto shelf 270 that extends a short way beneath hollow elongate frame 252. Shelf 270 is provided to support the bottom of a telescopically folded bag that may be placed on sidewall 252 adjacent front wall 274. Shelf 270 is hinged to front wall 274 of hollow elongate frame 252 and may be retained in its raised position as shown in FIG. 8 by elastic cords, ropes, chains or other straps which may be interconnected to hook elements on front wall 274 of sidewall 254. Shelf 270 may be lowered about its hinges 288 so that its free edge 290 may rest on the ground surface 7 while a folded bag is placed upon hollow elongate frame 252 with the lower part placed on shelf 270. Once loaded with the lower part of a telescopically folded bag, shelf 270 may then be pivoted about hinges 288 to its horizontal position and retained in position by cords 292 as illustrated in FIG. 9.

Guard plate 268 only extends into hollow elongate frame 252 sufficiently to overlie shelf 270 to prevent bulk material from falling onto the telescoped folds of the lower portion of a bag (not illustrated) lying on shelf 270.

Hollow elongate frame 252 is also provided with first side baffle 276 and a second side baffle 278 (see FIG. 9) which serve to urge bulk material entering hollow elongate frame 252 through discharge opening 262 to move rearward into a bag which may surround hollow elongate frame 252.

Now, referring to the rear end view of machine 200 illustrated in FIG. 9, the interior features of hollow elongate frame 252 may be seen. Discharge opening 262 is seen to be bifurcated by dividing wall 206 such that first ram 202 is operable within first subchamber 210 and second ram 204 is operable within second subchamber 212. Preferably, rams 202, 204 are each rectangular, being wider than they are tall. Discharge opening 262 is sized and shaped so that each ram will in turn fill one-half of discharge opening 262. Curved deflector 258 extends across the entirety of a lower portion of discharge opening 262 such that bulk material being thrust through discharge opening 262 will be urged upward. Upper baffle 264 and side baffles 276, 278 extend forward from front wall 274 of hollow elongate frame 252 to direct bulk material exiting discharge opening 262 toward rear end 266 (see FIG. 8) of frame 252.

Elevator 230 includes upper end 280 which overlies aggregator compartment 232 such that bulk material falling from upper end 280 will drop into aggregator compartment 232. Elevator 230 is preferably about six feet in width so that bulk material may be fed to machine 200 in a rapid manner.

Elevator 230 may be reoriented from the operational position illustrated in FIG. 9 to a storage-for-transport position whereupon first hydraulic cylinder 282 may draw elevator 230 toward machine body 250 and second hydraulic cylinder 284 may draw elevator 230 upward so that its lower end 286 is raised safely above the ground surface 7 for transport. Hydraulic cylinders 282, 284 permit a variety of orientations for elevator 230 relative to machine body 250. Hydraulic cylinders 282, 284 may be powered by the onboard hydraulic system of the tractor or power unit used to drive machine 200.

FIG. 10 discloses a preferred alternative ram system for operation within machine body 250. Two or more horizontally adjacent ram members 202, 204 may be operable within transfer chamber 236. Preferably a pair of side-by-side ram members 202, 204 are driven in alternating fashion such that first ram member 202 is driven toward discharge opening 262 as second ram member 204 is retracted and subsequently first ram member 202 is retracted as second ram member 204 is driven toward discharge opening 262. This arrangement reduces the vibrations developed in machine 200 due to the pounding action of a single ram 34 as illustrated in the embodiments of FIG. 2.

An upright dividing wall 206 is permanently mounted along the midline of chamber 236 to provide subchambers 210, 212 in which first and second ram members 202, 204 reciprocate. Dividing wall 206 extends forward of rear end wall 256 of machine body 250 approximately twenty-two inches as that is the preferred stroke length of ram members 202, 204. The working faces 214, 216 of first and second ram members 202, 204 are driven only to the discharge opening 262. Ram members 202, 204 may be driven by drive arms 226, 228 that are coupled to gearbox 218 that in turn is powered by the power take off of a tractor or other power unit, or by other engine means such as an internal combustion engine or electric motor or hydraulic motor.

Each of ram members 202, 204 may comprise a ram body such as shown in the enlargement of the ram body 86 shown in FIGS. 4 and 4a, with a spear element 60 protruding from the working face 214, 216 of each ram member 202, 204, or alternatively, the working face 214, 216 of each ram member 202, 204 may be planar or it may be provided with a protrusion such as protrusion 98 shown in FIGS. 5 and 5a. Preferably working faces 214, 216 are planar and oriented vertically.

In the preferred embodiment of FIGS. 8, 9, and 10, rams 202, 204 are approximately eleven inches tall and thirty inches wide while the space between free edge 260 of curved deflector 258 and upper baffle 264 is approximately ten inches.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, I claim:

1. A bag filling apparatus comprising
an elongate hollow housing disposed generally horizontally and having an opening at an outlet end thereof,
at least one driven ram reciprocatingly moveable within the housing between a retracted position and an extended position,
the at least one driven ram having an engagement face oriented toward the outlet end of the housing,
the engagement face urging bulk material toward the outlet end of the housing during movement of the ram toward its extended position,
a hollow elongate frame supported entirely on the housing at its outlet end,
the frame comprising a generally horizontally disposed outer surface,
the frame receiving an open end of an elongate silage bag thereabout and storing unused portions of the bag on the outer surface thereof.

2. The bag filling apparatus of claim 1 wherein
a pair of driven rams is reciprocatingly moveable within the housing,
the rams situated horizontally adjacent,
a first of the rams is driven toward the extended position as a second of the ram is driven toward the retracted position,
each of the rams urging bulk material toward the outlet end of the housing during movement of the ram toward its extended position.

3. The bag filling apparatus of claim 2 wherein
an upright dividing wall is disposed between the first ram and the second ram.

4. The bag filling apparatus of claim 1 wherein
the bulk material is compost.

5. The bag filling apparatus of claim 1 wherein
the bulk material is distillers grains.

6. The silage bag filling apparatus of claim 1 wherein
a curved deflector is disposed within the frame adjacent the opening at the outlet end of the housing,
whereby bulk material passing through the opening is urged upward by the curved deflector.

7. The bag filling apparatus of claim 1 wherein
the housing is supported on ground engaging wheels,
a brake mechanism selectively restricting rotation of the wheels.

8. The bag filling apparatus of claim 1 wherein
the at least one ram is moveable toward the outlet end at a slight incline.

9. The bag filling apparatus of claim 1 wherein
the frame has an open bottom.

10. A bag loading apparatus comprising
an elongate hollow housing disposed generally horizontally and having an opening at an outlet end thereof,
at least a first driven ram reciprocatingly moveable within the housing between a retracted position and an extended position, the at least a first ram having an engagement face oriented toward the outlet end of the housing, the engagement face urging bulk material toward the outlet end of the housing during movement of the ram toward its extended position, a hollow elongate frame supported entirely on the housing at its outlet end, the frame having a generally horizontally disposed outer surface, the frame receiving an open end of an elongate bulk material storage bag thereabout and storing unused portions of the bag on the outer surface thereof.

11. The bag loading apparatus of claim 10 wherein the bulk material comprises compost, fodder and distillers grains.

12. The bag loading apparatus of claim 10 wherein a second ram is reciprocatingly moveable within the housing between a retracted position and an extended position, the second ram having an engagement face oriented toward the outlet end of the housing, the engagement face of each ram urging bulk material toward the outlet end of the housing during movement of each ram toward the extended position thereof.

13. The bag loading apparatus of claim 10 wherein a deflector element is fixed to the outlet end of the housing and is disposed within the frame, the deflector element touchingly engaging bulk material exiting the opening at the outlet end of the housing.

14. Apparatus to force bulk material into an elongate bulk material storage bag, the storage bag having an elongate continuous sidewall, comprising an elongate chamber disposed generally horizontally, the chamber comprising at least one reciprocating ram moveable linearly therein, the chamber having a discharge end with an outlet opening therein, the chamber having an opening therein to permit bulk material to be received therein, a duct supported on the discharge end of the chamber and extending therefrom, the duct having a substantially horizontal sidewall and an open bottom, the duct having an interior in communication with the outlet opening of the chamber, the duct receiving an open end of the storage bag thereabout, the sidewall of the duct supporting gathered portions of the continuous sidewall of the storage bag, the at least one ram urging bulk material through the outlet opening into the storage bag surrounding the duct.

15. The apparatus of claim 14 wherein a second driven ram is reciprocatingly moveable within the chamber between a retracted position and an extended position, the at least one driven ram extending toward the discharge end when the second driven ram is retracting from the outlet end.

16. The apparatus of claim 14 wherein the bulk material is chosen from the group comprising compost, fodder, grain, distillers grains and silage.

17. The apparatus of claim 14 wherein an elevator is attached to the chamber, the elevator elevating bulk material to the opening in the chamber.

18. The apparatus of claim 14 wherein at least a second driven ram is reciprocatingly moveable within the chamber between a retracted position and an extended position, each of the at least one driven ram and the at least a second driven ram extending toward the discharge end at different times.

19. The apparatus of claim 14 wherein a second driven ram is reciprocatingly moveable within the chamber between a retracted position and an extended position, the at least one driven ram extending toward the discharge end when the second driven ram is retracting from the outlet end, each ram is moveable toward the discharge end of the chamber at a slight incline, a curved deflector disposed within the duct adjacent the outlet opening of the chamber, the duct comprising an open bottom and a curved sidewall, the bulk material is chosen from the group comprising compost, fodder, grain, distillers grains and silage, an elevator elevating bulk material to the opening in the chamber.

* * * * *